April 20, 1954  S. A. JACQUES  2,675,831

SEATLESS VALVE

Filed Dec. 26, 1950

INVENTOR.
Stanley A. Jacques
BY
Attorneys

Patented Apr. 20, 1954

2,675,831

UNITED STATES PATENT OFFICE 2,675,831

SEATLESS VALVE

Stanley A. Jacques, Chicago, Ill., assignor to Askania Regulator Company, Chicago, Ill., a corporation of Illinois Application December 26, 1950, Serial No. 202,731

3 Claims. (Cl. 137—625.48)

The present invention relates to a two-way hydraulic valve, and especially one that has a valve body connected to a solenoid for movement to one of its two positions and that is biased by spring means toward its other position. In actual experience with valves of this type wherein the movable valve body contacted an end opening valve seat at one limit of its movement, it was found that excessive valve seat wear resulted from a hammering action resulting from valve body movement.

The primary object of the invention is to provide a hammerless valve arrangement for operation in one direction by a solenoid and in the opposite direction by a biasing spring. Another object is to provide a highly specialized arrangement of such a valve for high-pressure service of the order of upward of 500 pounds per square inch and which valve is so arranged as to prevent binding by an unbalanced or unsymmetrical exertion of the pressure on the movable valve body.

In the accompanying drawings, Figs. 1 and 2 respectively are longitudinal median sections through a valve arrangement in accordance with the invention and respectively showing the valve and its operating systems in the two conditions in the valve.

Figure 1:
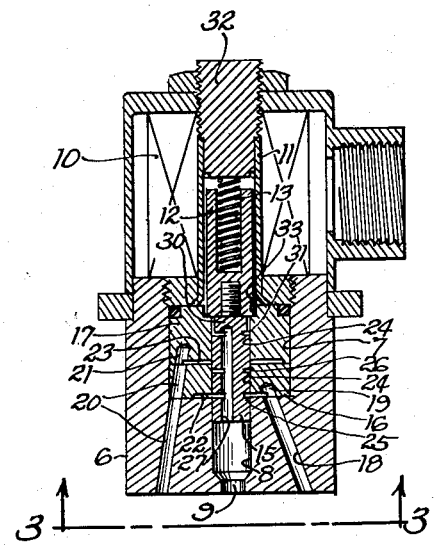

The valve arrangement of the present invention comprises a body portion 6 that encloses a large bore portion 7, and a valve body bore portion 8 concentric with bore 7 and terminating in a port 9. A combination solenoid and bias spring unit is assembled with body 6, such unit comprising a casing, a coil 10 mounted in the casing and wound on a spool 11, wherein is slidable a solenoid armature 12. A bias spring 13 is arranged inside spool 11 for moving the armature 12 to its limit position opposite that to which it is moved by energization of coil 10.

A valve body 15 is rigidly secured to armature 12 in concentric relation to the latter and extended axially from it in the direction of force exerted by bias spring 13.

Inside the main large bore 7 is a first stationary valve part 16 and a second stationary valve part 17, these parts being mounted in successive order in bore 7.

A passage 18 extends through main body 6 and registers with a pocket 19 in valve part 16. Aligned bores 20 in main body 6 and valve part 16 communicate with a pocket 21 in valve part 17. Annular recesses 22 and 23 are provided respectively in the surface of valve part 16 that lies adjacent the inner end of bore 7 and the surface of valve part 17 that contacts the second surface of valve part 16, and these recesses respectively communicate with pockets 19, 21. Central bores 24 extend through valve parts 16 and 17 and register with bore 8 of main body 6 and are of the same size as the latter to form with the latter a continuous bore of uniform diameter. Valve body 16 is axially movable in this valve bore.

The port 9 at the end of bore 8 is the common port that is selectively connectible with either recess 22 and passage 18, or with recess 23 and passage 20, by movement of valve body 15 to its two positions. To this end valve body 15 is provided with annular or circumferentially extended recesses 25, 26 that respectively are registrable with recess 22 when body 15 is in one of its positions and with recess 23 when valve body 15 is in its other position. A longitudinal passage 27 is provided in body 15 in eccentric relation to its axis, this passage 27 by its eccentricity opening through the recesses 25, 26. This arrangement of an eccentric passage and circumferential recesses, or grooves 25, 26, opening into it avoids complex and difficult manufacturing procedures that would have to be employed were passage 27 concentric with body 15, and additionally providing a substantial body strength. The employment of port recesses 23 completely surrounding the valve bore, and the employment of the circumferential valve body recesses 25, 26, provide a completely balanced condition of valve body 15 that avoids its being thrust against a side of the valve bore that would result were ports to be arranged to occupy limited areas at one side of the valve body.

The valve also is balanced against disturbing effect of high-fluid pressure at port 9 and effective axially upon body 15. This balance is provided by a reduced end portion 30 of valve body that extends from a third circumferential recess 31 of body 15 that communicates with passage 27, to the adjacent end of body 15. Armature 12 is sufficiently loose inside spool 11 to permit fluid to escape from valve bore 24 to the end of the armature opposite that to which valve body 15 is attached. This provides a straight-through connection between port 9 and the remote end of armature 12 and equal pressures are applied to opposite ends of the movable part of the valve assembly. The spool is securely blocked against fluid leakage, a stopper 32 being sealed into the end of the spool and threaded into the housing.

Figure 2:
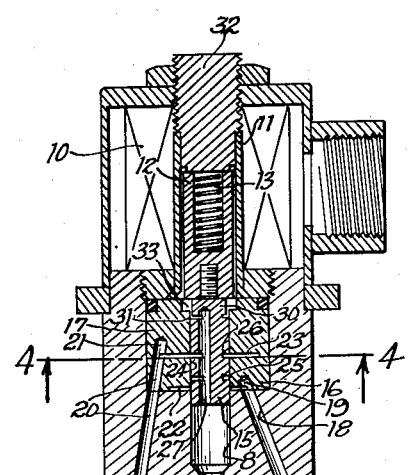
Figure 3:
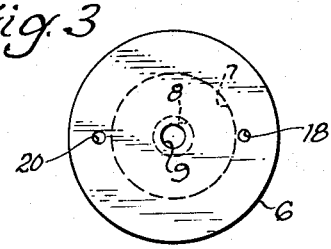
Fig. 3 is an end plan as shown by line 3—3 of Fig. 1.
Figure 4:
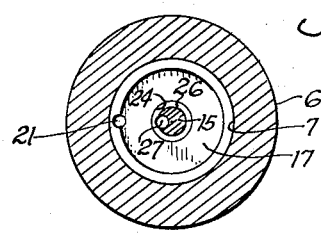
Fig. 4 is a section on line 4—4 of Fig. 2.
Figure 5:
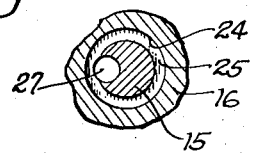
Fig. 5 is a fragmentary enlargement of the central portion of Fig. 4.

It will be seen from Figs. 1 and 2 that the upper stationary valve part 17 is provided with a recess 33 into which the end of the armature 12 is movable under the force exerted by bias spring 13. The inner end surface of this recess serves as a stop to position the valve body and armature assembly with recess 25 registered with recess 22. The opposite end of armature 12 is stopped by the inner end surface of stopper 32 when the solenoid is energized to move the armature and valve body to its second position wherein recess 26 is registered with recess 23.

It will now be evident that an essential feature of the valve is the provision of the casing structure with port-form recesses that completely surround the valve bore and that are spaced for independent connection with the common port 9. The provision of the valve body with preferential recesses such as 25, 26, provides for effective establishment of this communication. The particular port for recess arrangement of the valve body may obviously vary considerably from that disclosed, for example, by providing a single port that can be registered with either of the stationary recesses by appropriate positioning of the valve body. The formation of the recesses that provide the stationary ports as annular recesses in the ends of valve bore forming inserts additionally is a very convenient feature of the valve.

I claim:

1. A multiway valve comprising casing structure provided with a valve bore, a common port that opens into one end of said bore and a pair of port-forming recesses spaced along said bore from said port, and a valve body reciprocally in said bore, said body enclosing a longitudinal passage that opens through the body and adjacent said port, a pair of recesses each extended completely about the valve body in axial spacing different from that of said casing structure recesses and for selective registration of only one of the former with one of the latter at one time, said valve body having also reduced portion at the end opposite the one through which said passage opens and providing a recess extended completely about the periphery of said body and inward from its end, and each of said body recesses being in communication with said passage.

2. A multiway valve in accordance with claim 1, wherein said passage is eccentric relative to the axis of said body, and each of said body recesses is of uniform depth throughout its extent and intersect said eccentric passage.

3. A valve body comprising an elongate element having therein only a single longitudinal passage, said passage being eccentric relative to the central longitudinal axis of said body, and said body having a recess of uniform depth extended completely about the periphery of the body and intersecting said passage.

References Cited in the file of this patent
UNITED STATES PATENTS

| Number | Name | Date |
|---|---|---|
| 1,785,289 | Tucker | Dec. 16, 1930 |
| 1,926,868 | Galloway | Sept. 12, 1933 |
| 2,087,387 | Price | July 20, 1937 |
| 2,379,181 | Pontius | June 26, 1945 |
| 2,411,258 | Galloway | Nov. 19, 1946 |
| 2,529,397 | Nottkamp | Nov. 7, 1950 |